United States Patent [19]

McCauley

[11] Patent Number: 5,029,808
[45] Date of Patent: Jul. 9, 1991

[54] LOCK ASSEMBLY FOR VALVE

[75] Inventor: Lewis D. McCauley, Eggertsville, N.Y.

[73] Assignee: McGard, Inc., Orchard Park, N.Y.

[21] Appl. No.: 568,243

[22] Filed: Aug. 15, 1990

[51] Int. Cl.$^5$ .............................................. F16K 35/06
[52] U.S. Cl. ...................................... 251/95; 251/208; 251/292; 251/305; 411/403; 411/910
[58] Field of Search ................. 251/95, 96, 98, 99, 251/101, 102, 104, 107, 109, 110, 111, 113, 205, 208, 305, 306, 308, 291, 292; 70/176, 177, 409; 411/403, 407, 910

[56] References Cited

U.S. PATENT DOCUMENTS

| | | | |
|---|---|---|---|
| 657,059 | 8/1900 | Broomell | 251/110 |
| 961,466 | 6/1910 | Shade | 251/109 |
| 1,032,649 | 7/1912 | Bieniek | 251/109 |
| 2,847,181 | 8/1958 | Muller | 251/101 |
| 3,241,408 | 3/1966 | McCauley | 411/910 |
| 3,311,128 | 3/1967 | Taylor | 251/98 |
| 3,329,394 | 7/1967 | Overbaugh | 251/99 |
| 3,355,141 | 11/1967 | Cooper | 251/101 |
| 3,460,800 | 8/1969 | Mikuls | 251/101 |
| 3,537,473 | 11/1970 | DeZurik, Jr. | 251/96 |
| 3,921,955 | 11/1975 | Haddad, Jr. | 251/305 |
| 4,093,178 | 6/1978 | Hughes et al. | 251/110 |
| 4,162,782 | 7/1979 | Wilkins | 251/305 |
| 4,480,513 | 11/1984 | McCauley et al. | 411/403 |
| 4,570,901 | 2/1986 | Holtgraver | 251/98 |
| 4,723,866 | 2/1988 | McCauley | 411/910 |
| 4,726,723 | 2/1988 | Bainbridge | 411/910 |
| 4,815,693 | 3/1989 | James et al. | 251/305 |

FOREIGN PATENT DOCUMENTS 0021885 1/1981 European Pat. Off. .............. 251/98

Primary Examiner—George L. Walton
Attorney, Agent, or Firm—Joseph P. Gastel

[57] ABSTRACT

A locking construction for addition to an existing valve having a valve body, a flange on the valve body, a valve member in the valve body, a valve stem coupled to the valve member and extending through the flange for moving the valve member between various positions, the locking construction including a locking plate securely locked to the flange by bolts which can be removed only with a specialized kay, a plurality of tapped bores in the locking plate, an operating plate slidably mounted on the locking plate and keyed to the valve stem, bores in the operating plate for alignment with the tapped bores in the locking plate, and locking bolts extending through the bores in the operating plate and received in the tapped bores in the locking plate for locking the valve stem in position, the last-mentioned locking bolts capable of being manipulated only by a specialized key.

15 Claims, 3 Drawing Sheets

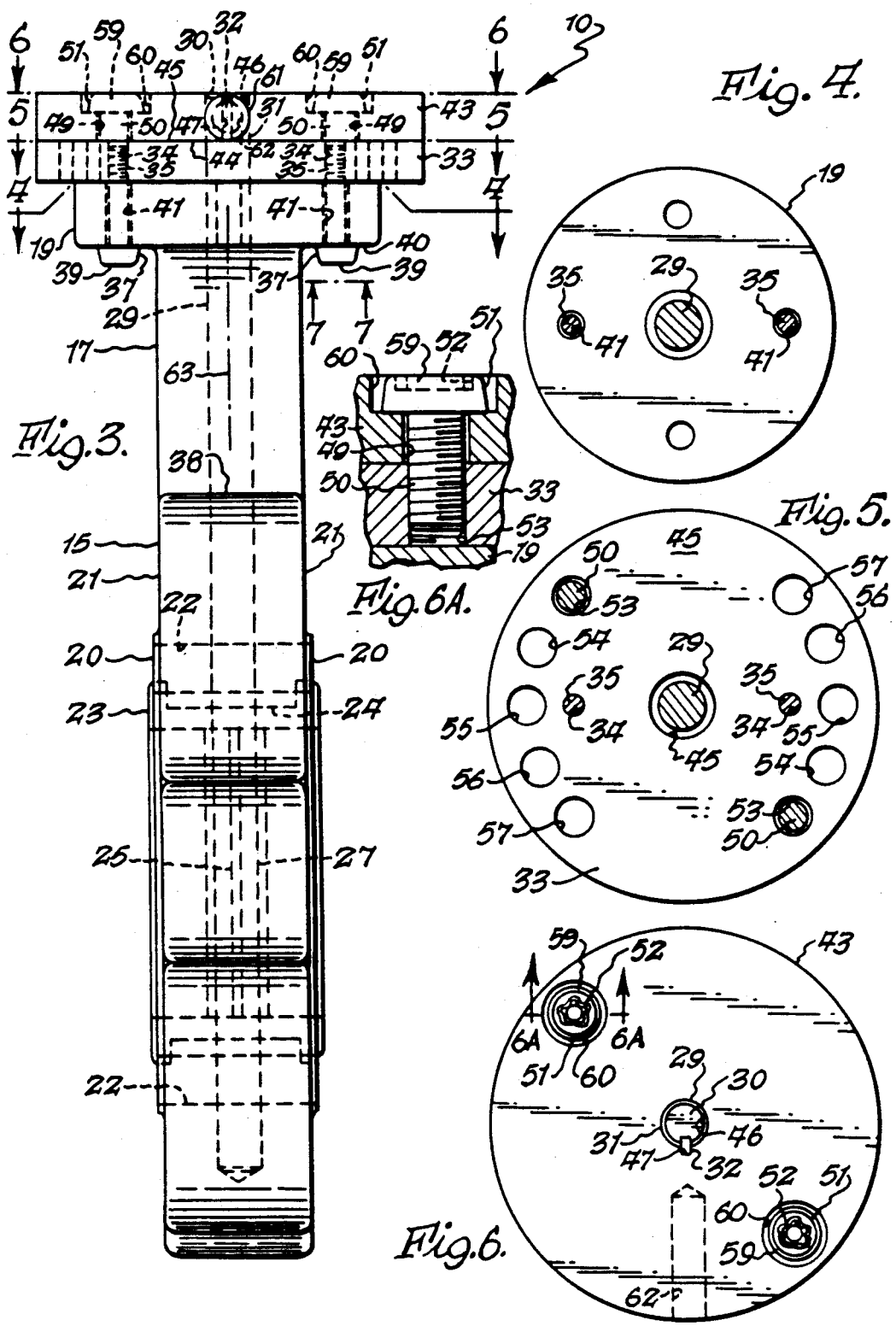

LOCK ASSEMBLY FOR VALVE

BACKGROUND OF THE INVENTION

The present invention relates to a locking construction which can be mounted onto an existing valve to prevent unauthorized manipulation thereof.

By way of background, there are certain applications wherein it is desirable that tampering with valves be prevented. One such application is where valves are associated with natural gas supply pipes and a meter located outside of a building. In installations of this type, there is a bypass pipe around the meter. A valve is associated each of the inlet and outlet pipes of the meter to shut off the flow of gas thereto when they are closed. Another valve is located in the bypass pipe to permit the gas to be selectively routed through the bypass pipe when this valve is open to continue gas flow to the building if the valves associated with the meter are closed to permit the meter to be removed for replacement or repair. However, in an installation of this type, it is possible to unauthorizedly bypass the meter by opening the valve in the bypass pipe even though the valves associated with the meter remain open.

SUMMARY OF THE INVENTION

It is one object of the present invention to provide a locking construction which can be mounted onto existing installed valves in the field without in any way physically altering the valves themselves other than removing the handle structure which is utilized for turning the valve.

Another object of the present invention is to provide a locking construction which is extremely simple to install onto an existing valve, and which, once installed, can only be unlocked by personnel having the proper keys. Other objects and attendant advantages of the present invention will readily be perceived hereafter.

The present invention relates to a locking construction for locking a valve in at least one of a plurality of various positions wherein said valve has a valve body, first and second portions in said valve body, a valve member in said first portion of said valve body, a valve stem coupled to said valve member and extending through said second portion of said valve body for moving said valve member between various positions, said locking construction comprising a first member, first means for securely attaching said first member in locked engagement to said second portion of said valve body, a second member, second means for securing said second member to said valve stem, and third means for locking said second member to said first member in at least said one of said various positions.

The various aspects of the present invention will be more fully understood when the following portions of the specification are read in conjunction with the accompanying drawings wherein:

BRIEF DESCRIPTION OF THE DRAWINGS

FIG. 3 is a side elevational view taken substantially in the direction of arrows 3—3 of FIG. 2;

FIG. 4 is a cross sectional view taken substantially along line 4—4 of FIG. 3 and showing the relationship between the flange at the top of the valve and the locking bolts for locking the valve locking plate to the flange;

FIG. 5 is a cross sectional view taken substantially along line 5—5 of FIG. 3 and showing the valve locking plate and its relationship to the stem of the valve and to the locking bolts for mounting it on the valve flange and to the locking bolts for locking a valve operating plate thereto in a plurality of adjusted positions;

FIG. 6 is a plan view taken substantially in the direction of arrows 6—6 of FIG. 3 and showing the valve operating plate and its relationship to the valve stem and showing the locking bolts for locking the operating plate to the locking plate;

FIG. 6A is a fragmentary cross sectional view taken substantially along line 6A—6A of FIG. 6;

DESCRIPTION OF THE PREFERRED EMBODIMENTS

Figure 1:
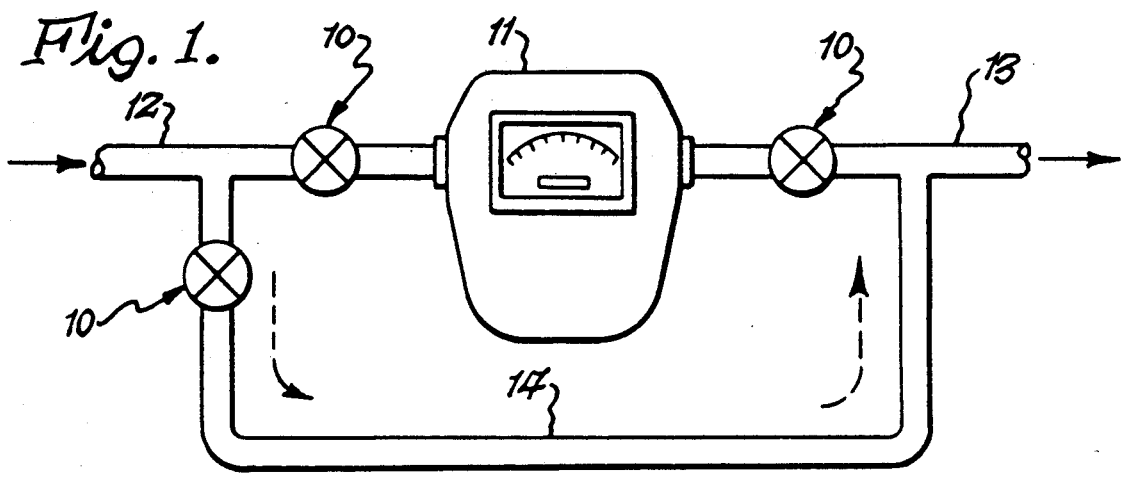
FIG. 1 is a fragmentary schematic side elevational view showing a plurality of improved locking valves of the present invention associated with a natural gas pipe having a gas meter therein and a bypass pipe around the gas meter.

By way of brief background, a plurality of locking valves 10 of the present invention are shown associated with a piping arrangement for a natural gas meter 11. More specifically, one valve 10 is located in inlet pipe 12 leading from a main gas pipe to meter 11, and another valve 10 is located in gas pipe 13 which leads from meter 11 to a consumer, such as an industrial plant. A bypass pipe 14 extends between pipes 12 and 13, and it has another valve 10 therein. During normal operation, valve 10 in bypass pipe 14 is closed and valves 10 in pipes 12 and 13 are open so that gas flows through meter 11 without passing through bypass pipe 14. However, under certain circumstances it is necessary to remove or check meter 11. Accordingly, valves 10 in pipes 12 and 13 are closed, and valve 10 in pipe 14 is opened to provide continued flow between lines 12 and 13. In the past, valves 10 were not locked in either their open or closed positions, and thus it was possible to close one of valves 10 in pipes 12 or 13 and open valve 10 in pipe 14 to permit gas to bypass meter 11 with the attendant economic loss to the gas company.

Figure 2:
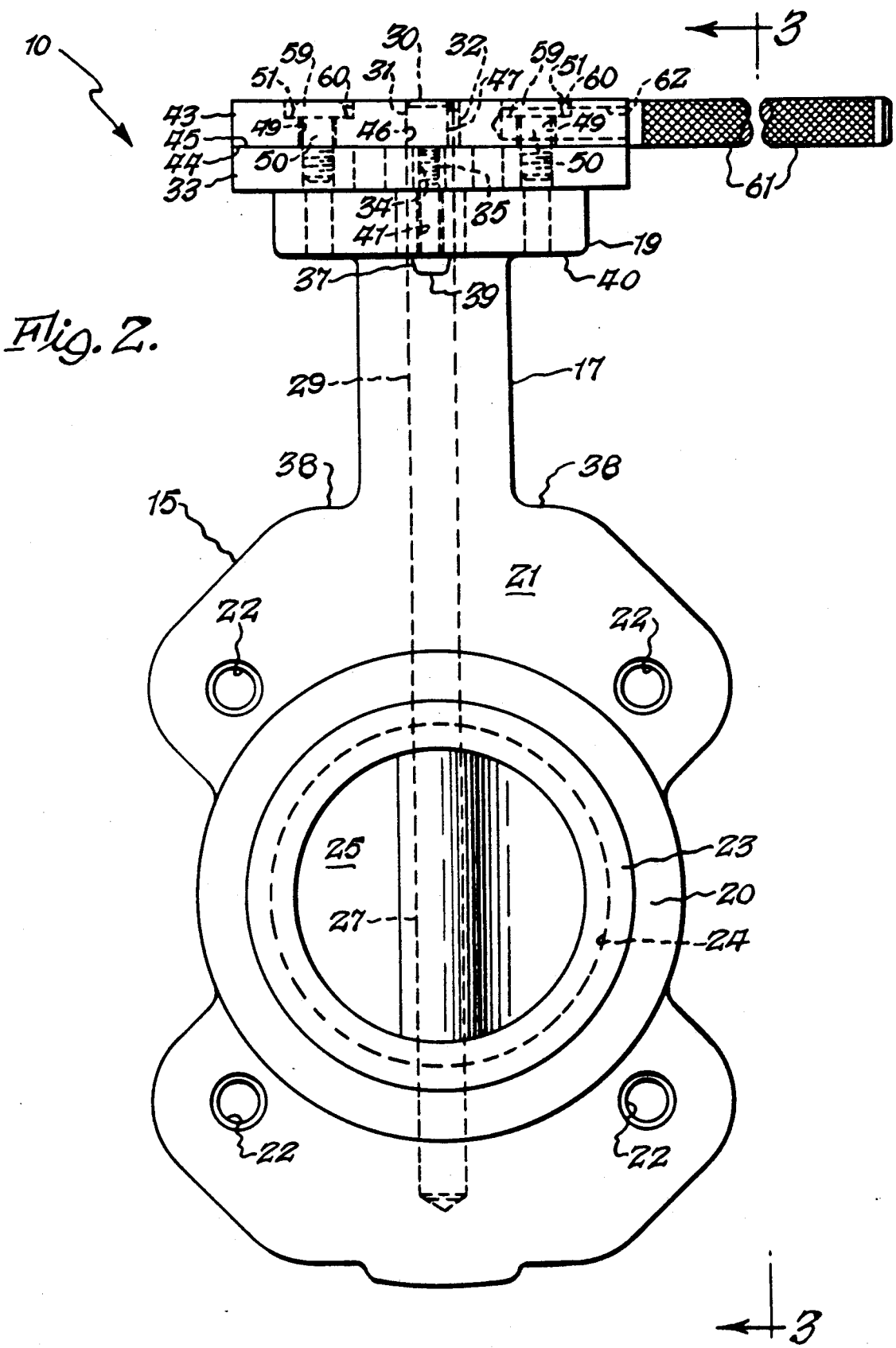
FIG. 2 is a fragmentary side elevational view of the improved locking construction of the present invention mounted on each of the valves shown in FIG. 1.

Locking valve 10 of the present invention includes certain existing structure to which the locking construction of the present invention is added. This existing valve structure includes a cast iron valve body 15 having an integral neck 17 and an integral flange 19 thereon. A finished surface 20 is located on each of the opposite sides 21 of the valve body 15 for placement in contiguous relationship to a flange of a gas pipe (not shown). A plurality of tapped bores 22 are located in valve body 15 for receiving the bolts (not shown) which secure the pipe flanges (not shown) to the valve body. A resilient annular insert 23 is located in bore 24 of the valve body for providing sealing engagement with butterfly valve 25 which is fixedly secured to the bottom portion 27 of valve stem 29 which is journalled within valve body 15, and which extends through neck 17 and central portion of flange 19. Stem 29 terminates at an upper end 30. The upper portion 31 of valve stem 29 has a key 32 suitably secured therein. The key 32 is for the purpose of entering a previously used handle (not shown) mounted on stem 29 for turning butterfly valve 25 between its closed position of FIGS. 2 and 3 and a fully open position wherein it extends substantially perpendicularly to the position shown in FIG. 2.

Figure 7:
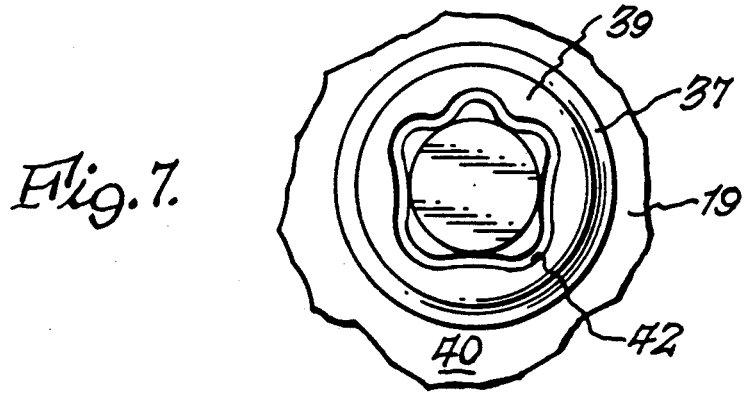
FIG. 7 is a fragmentary view taken substantially in the direction of arrows 7—7 of FIG. 3 and showing the configuration of the heads of the locking bolts for securing the locking plate to the flange of the valve.

In accordance with the present invention, a locking construction is mounted on flange 19 for permitting valve 25 to be locked in a fully closed position, fully opened position, or intermediate positions therebetween. The locking construction includes a disc-like cylindrical valve locking plate 33 which has tapped bores 34 therein for receiving the stems 35 of locking bolts 37 having heads 39 which bear on the undersurface 40 of flange 19 when they are fully threaded into tapped bores 34. The stems 35 extend through slightly larger oversized bores 41 in flange 19. As can be seen, bores 41 are located adjacent valve faces 21 so that shoulders 38 will not impede access to bolt heads 39. The head 39 of each bolt 37 has a curvilinear groove 42 therein (FIG. 7) for receiving a specialized key of mating configuration, as will be described in greater detail hereafter. Stem 29 extends through an oversized bore 45 (FIG. 5) in locking plate 33.

A disc-like cylindrical operating plate 43 has a planar lower surface 44 which is located in contiguous sliding relationship to planar upper surface 45 of locking plate 33. The upper portion 31 of stem 29 is received in bore 46 of operating plate 43, and key 32 on stem 29 is received in keyway 47 in plate 43. Thus, when operating plate 43 is turned, stem 29 and butterfly valve 25 will be turned with it.

Operating plate 43 has a pair of oversized bores 49 (FIGS. 2 and 6A) therein. A stem 50 of each locking bolt 51 extends through each bore 49 in operating plate 43. The pair of locking bolts 51 is selectively threadably received in one of the tapped bore pairs 53—53 or 54—54 or 55—55 or 56—56 or 57—57. In this respect, the centers of the two bores 49 in operating plate 43 are diametrically opposite to each other and are spaced at the same radial distance from the center of plate 43. Each one of the pair of tapped bores 53—53, 54—54, 55—55, 56—56, and 57—57 is diametrically opposite to its associated tapped bore and each of the tapped bores is located on the same circumference as bores 49 in plate 43. Thus, in various adjusted positions of operating plate 43, the diametrically spaced bores 49 therein can be registered with one pair of each of the diametrically spaced tapped bores of locking plate 33, such as 53—53, 54—54, etc. The heads 59 of locking bolts 51 are located in closely fitting counterbores 60 associated with bores 49, and thus are recessed within the upper surface of operating plate 43. The upper surfaces of bolt heads 59 have curvilinear grooves 52 therein for receiving specialized mating keys. A handle 61 can be selectively threaded into tapped bore 62 in operating plate 43 to turn plate 43 whenever locking bolts 51 are not located in any one of the bore sets 53—53 through 57—57 of the locking plate 33.

Figures 8, 9:
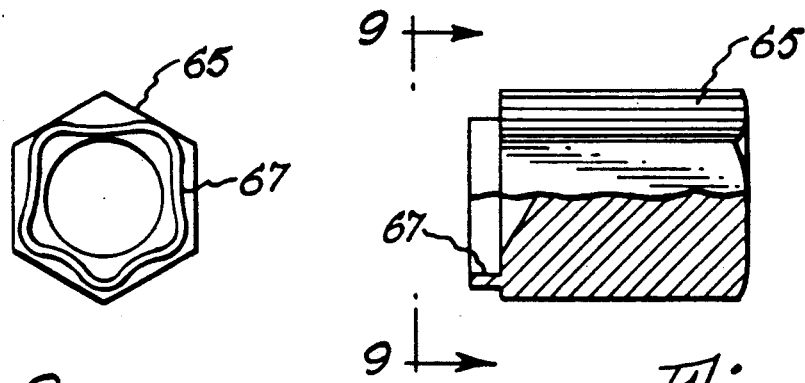
FIG. 8 is a side elevational view, partially broken away, of the key for turning the various bolts.
FIG. 9 is an end view taken substantially in the direction of arrows 9—9 of FIG. 8.

In operation, whenever bores 49 of operating plate 23 are aligned with bores 53 of locking plate 33, the valve 25 will be in a fully closed position. A visual indication of this is that key 32 will be aligned with the axis 63 (FIG. 3) of the valve body, thereby indicating that valve 25 is in a fully closed position. When bores 49 are aligned with bores 54 of the locking plate, valve 25 will be one-quarter open. When bores 49 are aligned with bores 55 of the locking plate, valve 25 will be half open. When bores 49 are aligned with bores 56 of locking plate 45, valve 25 will be three-quarters open. When bores 49 are aligned with bores 57 of locking plate 33, valve 25 will be fully open. The locking bolts 51 can be inserted into any pair of bores in locking plate 33 which are in alignment with the pair of bores 49 in operating plate 43. As noted above, the locking bolts 51 and locking bolts 37 have grooves 52 and 42, respectively, which can only receive specialized keys, such as shown in FIG. 8. Briefly the key 65 has a ridge 67 which is of mating configuration to the grooves 42 and 52. Alternatively, if desired, different keys may be utilized for grooves 42 and 52. Therefore, unless a party has such a specialized key for removing bolts 51, he cannot manipulate valve 10 to various positions. Furthermore, a plug (not shown) with a similar curvilinear groove can be used to close bore 62 when handle 61 is not threaded therein.

While the locking construction has been disclosed as associated with gas pipe valves, it will be appreciated that it has universal applicability.

While preferred embodiments of the present invention have been disclosed, it will be appreciated that it is not limited thereto but may be otherwise embodied within the scope of the following claims.

What is claimed is:

1. In a valve having a valve body, first and second portions in said valve body, a valve member in said first portion of said valve body, and a valve stem coupled to said valve member and extending through said second portion of said valve body for moving said valve member between various positions: a lock structure for locking said valve member in at least one of said various positions comprising a first member, first means for securely attaching said first member in locked engagement to said second portion of said valve body, a second member, second means for securing said second member to said valve stem, and third means for locking said second member to said first member in at least said one of said various positions, said second portion of said valve body comprising a flange, said first means comprising key-operated bolt means extending between said flange and said first member, said third means comprising second key-operated bolt means extending between said second member and said first member, said first and second members having first and second surfaces, respectively, in abutting engagement when said third means locks said second member to said first member, said first member being a disc-like plate, a plurality of tapped apertures in said disc-like plate for selectively receiving said second key-operated bolt means for locking said valve member in a plurality of adjusted positions, said second member being a second disc-like plate which covers said tapped apertures in said disc-like plate, said second disc-like plate being of substantially the same cross sectional dimension as said disc-like plate, said plurality of tapped apertures comprising a plurality of pairs of tapped apertures with each tapped aperture of each of said pairs being diametrically opposite to the other of the tapped aperture of the same pair, said second key-operated bolt means extending through apertures in said second disc-like plate which are diametrically opposite to each other, and said tapped apertures in said disc-like plate and said apertures in said second disc-like plate lying on circumferences of the same size, whereby when said second disc-like plate is rotated to align said apertures therein with a selected pair of said tapped apertures in said disc-like plate and said second key-operated bolt means are passed through said apertures and are received in said tapped apertures in alignment therewith, said second disc-like plate and said valve stem and said valve member coupled thereto are locked in a selected position.

2. In a valve having a vale body, a first portion in said valve body, a valve member in said first portion of said valve body, a second portion in said valve body terminating at a flange having a flange surface, holes in said flange, and a valve stem coupled to said valve member and extending through said second portion of said valve body and beyond said flange for moving said valve member between various positions: a lock structure for mounting on said flange for locking said valve member in various positions comprising a first disc-like plate for placement in contiguous relationship to said flange surface, first tapped apertures in said first disc-like plate, first bolt means extending through said holes in said flange and into said first tapped apertures, first head means on said first bolt means bearing on the side of said flange which is opposite to said flange surface, a plurality of second tapped circumferentially spaced apertures in said first disc-like plate, a first flat surface on said first disc-like plate which is on the opposite side thereof from said flange, a second disc-like plate overlying said first disc-like plate, a second flat surface on said second disc-like plate in contiguous abutting sliding relationship with said first flat surface, means for securing said second disc-like plate to said valve stem, aperture means in said second disc-like plate for selective alignment with each of said plurality of said second tapped apertures of said first disc-like plate, second bolt means for extending through relatively aligned aperture means in said second disc-like plate and said second tapped apertures in said first disc-like plate for locking said second disc-like plate to said first disc-like plate to thereby lock said valve member in various positions, said second bolt means having second head means which effectively bear on said second disc-like plate on the opposite side thereof from said first disc-like plate, and said second head means having key-receiving means for receiving only a fitting key for effecting turning thereof.

3. In a valve as set forth in claim 2 including counterbore means in said second disc-like plate, and said second head means being located in said counterbore means.

4. In a valve as set forth in claim 2 including second key-receiving means in said first heads.

5. In a valve as set forth in claim 4 including counterbore means in said second disc-like plate, and said second head means being located in said counterbore means.

6. In a valve as set forth in claim 2 wherein said second disc-like plate covers certain of said second tapped apertures in said first disc-like plate not in alignment with said aperture means in said second disc-like plate.

7. In a valve as set forth in claim 2 wherein said first and second disc-like plates are of substantially the same diameter.

8. In a valve as set forth in claim 2 wherein said second tapped apertures in said first disc-like plate comprise a plurality of paris of diametrically opposed apertures, and wherein said aperture means in said second disc-like plate comprise a pair of diametrically opposed apertures.

9. In a valve as set forth in claim 8 wherein said second disc-like plate covers those of said second tapped apertures in said first disc-like plate which are not in alignment with said pair of diametrically opposed apertures in said second disc-like plate.

10. In a valve as set forth in claim 9 wherein said first and second disc-like plates are of substantially the same diameter.

11. In a valve as set forth in claim 10 including second key-receiving means in said first head means.

12. In a valve as set forth in claim 11 including counterbore means in said second disc-like plate, and said second head means being located in said counterbore means.

13. In a valve as set forth in claim 12 including a handle, and means for selectively attaching said handle to and detaching said handle from said second disc-like plate.

14. In a valve as set forth in claim 2 including a handle, and means for selectively attaching said handle to and detaching said handle from said second disc-like plate.

15. In a valve as set forth in claim 14 wherein said second disc-like plate includes a side which extends transversely to said second flat surface, and wherein said means for selectively attaching said handle to and detaching said handle from said second disc-like plate includes bore means extending inwardly into said second disc-like plate from said side.

* * * * *